United States Patent
Zhao

(10) Patent No.: US 7,748,237 B2
(45) Date of Patent: Jul. 6, 2010

(54) CONVECTION GLASS HEATING FURNACE

(75) Inventor: Yan Zhao, Luovang Henan (CN)

(73) Assignee: Landglass Technology Co. Ltd, Luonyang (CN)

( * ) Notice: Subject to any disclaimer, the term of this patent is extended or adjusted under 35 U.S.C. 154(b) by 183 days.

(21) Appl. No.: 11/569,541

(22) PCT Filed: May 27, 2004

(86) PCT No.: PCT/CN2004/000550

§ 371 (c)(1),
(2), (4) Date: Nov. 27, 2006

(87) PCT Pub. No.: WO2005/115934

PCT Pub. Date: Dec. 8, 2005

(65) Prior Publication Data

US 2007/0220921 A1   Sep. 27, 2007

(51) Int. Cl.
*C03B 29/00* (2006.01)
*C03B 29/04* (2006.01)
*C03B 29/06* (2006.01)
*C03B 29/08* (2006.01)
*C03B 29/12* (2006.01)

(52) U.S. Cl. .................. 65/273; 65/182.1; 65/182.2; 65/335; 65/355

(58) Field of Classification Search ............. 65/355, 65/182.1, 182.2, 273, 335
See application file for complete search history.

(56) References Cited

U.S. PATENT DOCUMENTS 4,238,756 A * 12/1980 Immel ................... 338/304
5,669,954 A * 9/1997 Kormanyos ............. 65/273
6,470,711 B1 * 10/2002 Jarvinen et al. .......... 65/273

FOREIGN PATENT DOCUMENTS

EP           721922 A1 *  7/1996
WO    WO 03006390 A1 *  1/2003

* cited by examiner

*Primary Examiner*—Steven P Griffin
*Assistant Examiner*—Cynthia Szewczyk
(74) *Attorney, Agent, or Firm*—Gottlieb, Rackman & Reisman, P.C.

(57) ABSTRACT

The invention disclose a convection glass heating furnace, which includes upper and lower furnace bodies, at least one gas-collection box are set in the upper and lower furnace bodies respectively, glass inlets and outlets are setup in the gas-collection box, and a jet-flow plate is set at the gas outlets. The gas inlets of gas-collection box are connected with the exhaust port of a blower fan through pipelines. Gas heating devices are setup in the gas-collection boxes. The gas inlets of the blower fan and its upstream gas routes along with the exhaust port of the blower fan and its downstream gas route form a gas circulation loop together. Glass is heated in the heating furnace of the invention by the hot gas sprayed on its surfaces, so the deficiencies of low heating efficiency and long heating time can be effectively avoided when heating the glass with high reflectivity and transmission ratio. The power of the heating devices can be expediently selected according to the temperature and the flow rate of the hot gas needed, in particular, the hot gas sprayed on the upper and under surfaces of the glass can be set to different temperatures to make the upper and under surfaces of the glass be heated uniformly and ensure the heating quality.

11 Claims, 4 Drawing Sheets

CONVECTION GLASS HEATING FURNACE

TECHNOLOGICAL SCOPES

This invention relates to a glass heating furnace, especially a heating furnace used to heat glass with complete convection method.

BACKGROUND OF THE INVENTION

The existing glass heating furnaces are working with radiation mode, i.e. heating glass with infrared rays emitted from resistance heating elements. Because of smaller blackness of some kinds of glass, the reflectivity and transmission ratio are higher, it is not good for absorbing radiation heat, and therefore, heating with normal radiation mode has a problems of longer heating time and lower heating efficiency. For example, in case of LOW-E, great deal of heat is reflected, the temperature on the surface of glass cannot meet requirements. In addition, when heating with radiation, roller-table transfers heat direct to the lower surface of glass. This part of conductive heat is larger than the radiation heat received on upper surface of glass, which leads to some certain temperature difference between upper and lower surfaces of the glass, causing warping at the edges of glass, and white fog occurs at the part contacting with the roller-table, and finally affecting the processing quality of glass.

SUMMARY OF THE INVENTION

Aiming to the deficiency of the existing technology, the purpose of this invention is to provide a convection glass heating furnace. A jet-flow heating technology is used in this furnace. High temperature gas is blown onto the glass surface. Heating is completed with help of convection heat-exchange between high temperature gas and glass.

In order to reach the above goal, this invention—convection glass heating furnace includes upper and lower furnace bodies, at both sides of which, a glass inlet and an outlet are set respectively, a glass transportation roller-table is installed in the lower furnace body, at least one gas-collection box is set inside the upper furnace and the lower furnace respectively. This gas-collection box is a sealed box on which are set at least a gas inlet and a gas outlet, at the gas outlet is set a jet-flow plate; high temperature gas ejecting holes are set on the jet-flow plate. The gas outlet of the gas-collection box is facing the glass transportation roller-table, and has a certain distance to the glass transportation roller-table. The gas inlet of the gas-collection box is connected with the exhaust port of the fan through a pipe. Gas heating devices are set at the gas passage composed of exhaust port of the fan, pipes, gas-collection box, and the high-temperature gas jetting port on the jet-flow plate of gas-collection box. At least an exhaust port is set on the upper and lower furnace bodies respectively. Gas inlet of the fan connects with the exhaust ports of the upper and lower furnace bodies through pipes. A gas circulation loop is composed of the inlet of the fan and its upstream gas route and the exhaust port of the fan and its downstream gas route.

In addition, the mentioned gas-collection boxes in the upper and lower furnace bodies are connected with its own fan. An independent gas circulation loop is formed respectively.

In addition, exhaust gas recovery holes are set on the mentioned jet-flow plate, the exhaust gas recovery holes are connected with the inner cavity of the furnace body outside of the gas-collection box via pipes.

In addition, the mentioned jet-flow plate is in shape of wave, and the mentioned high-temperature gas ejecting holes are distributed near the wave though of the roller-table on the mentioned lower furnace body. The exhaust gas recovery holes are set at the wave crest of the roller-table far from the mentioned lower furnace body.

In addition, the mentioned gas heating device is an electric heating element which is set inside of the gas collection box.

In addition, the mentioned heating element is a clip-port heater, which is composed of insulated porcelain and resistance wires or resistance tapes. There are several opening troughs around the insulated porcelain. A column is formed with numbers of overlaid insulated porcelains. Resistance wires or resistance tapes wind around the column in spiral form via the opening trough on the insulated porcelain. The two poles are lead out through the installation flange at one end of the column.

In addition, the mentioned gas-collection box in the upper furnace body can be installed on the furnace body and can be moved up and down by a suspension mechanism.

In addition, the mentioned suspension mechanism is a mechanism composed of screws and nuts, the gas-collection box is hung on the screws via nuts, and the screws are fixed on the upper furnace body, the top of which is connected with the control mechanism which set on the top part of wall of the furnace body. The control mechanism is a worm and gear control mechanism, or gears or chain wheels control mechanism.

In addition, the gas-collection box in the mentioned lower furnace body is supported on a lifting and lowing device which is installed on the lower furnace body and can move up and down.

The mentioned lifting and lowing mechanism is a lifting and lowing mechanism composed of screws and nuts, the mentioned gas collection box is fixed with nuts, and connected with the screws via nuts. The screw that can rotate is installed on the lower furnace body. Said screw is connected with the control mechanism of worm and gear, or with the gear or chain wheel control mechanism, and can rotate under control of the control mechanism.

This invention of the furnace uses the method of ejecting high-temperature gas onto the surface of glass to heat the glass. That eliminates the defects of lower heating efficiency and longer heating time during heating glass with higher heating reflectivity and higher transparency by using the traditional furnaces. After the heating element is set inside the gas-collection box, the power of the heating element can be selected easily according to the required temperature and flow of the high-temperature gas, especially, the high-temperature gas ejecting on the upper and lower surfaces of the glass can be set to different temperature, therefore, the upper and lower surfaces of the glass is heated evenly, which ensures the heating quality.

DETAILED DESCRIPTION OF THE INVENTION

Figure 1:
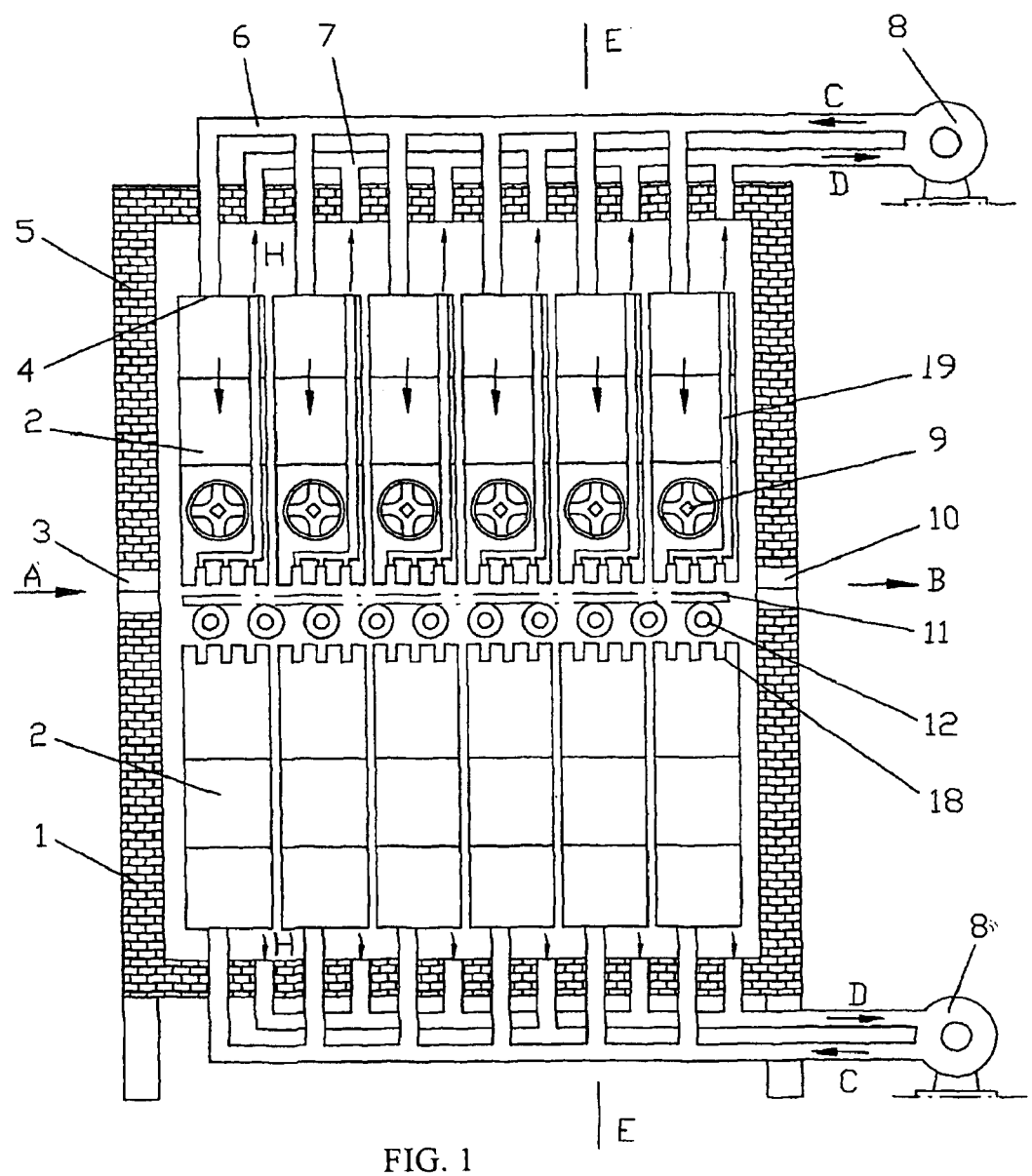
FIG. 1 is a sectional view of this invention.
Figure 2:
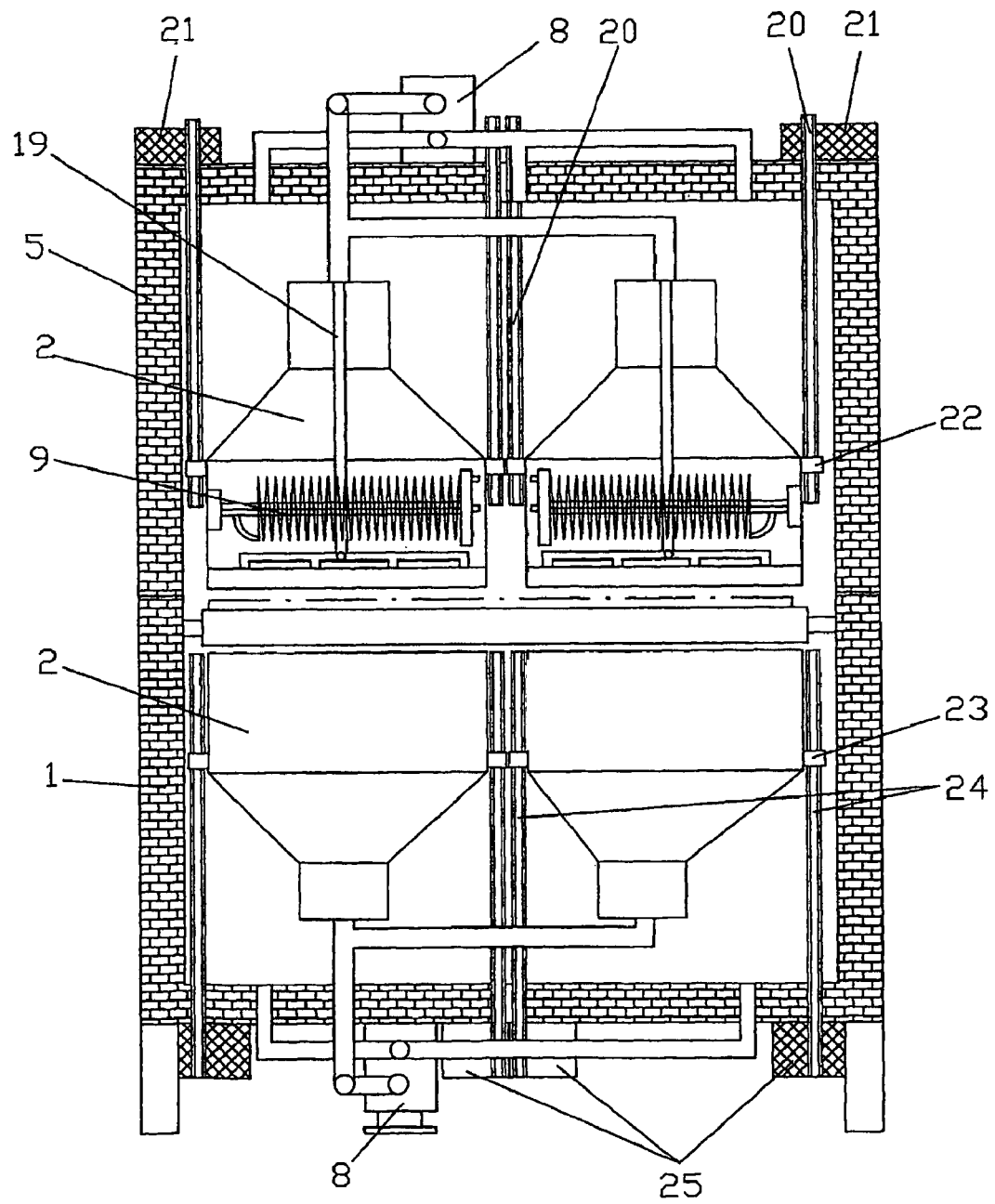
FIG. 2 is E-E view of FIG. 1.

As shown in FIGS. 1 and 2, convection glass heating furnace according to the invention includes lower furnace body 1, upper furnace body 5; glass inlet 3 and glass outlet 10 are set on both side of the upper and lower furnace bodies. Glass transporting roller-table 12 is installed on lower furnace body 1. Twelve gas-collection boxes 2 are set inside the upper and lower furnace bodies respectively. The gas-collection box 2 is a sealed box on which are set gas inlet 4 and gas outlet. At the gas outlet is set a jet-flow plate 18 on which are set a lot of high-temperature gas ejecting ports 16 and exhaust gas recovery holes 17 (see FIGS. 3 and 4). The gas outlet of the gas-collection box 2 is facing the glass transportation roller-table 12, and has a certain distance to the glass transportation roller-table 12. The gas inlet 4 of the gas-collection box 2 is connected with the exhaust port of the fan 8 by pipe 6. Clip-port electric heater 9 is set in each gas-collection box 2. The gas inlet of fan 8 inhales exhaust gas at exhaust gas recovery hole 17 on the jet-flow plate of the gas-collection box through pipe 7 and pipe 19 inside gas-collection box 2. Pipe 19 inside gas-collection box 2 leads the exhaust gas at exhaust gas recovery hole 17 into the inside cavity of the furnace body at the end of gas-collection box 2 which is far from the transportion roller-table. Gas inlet of fan 8, pipe 7, inner cavity of the furnace body, pipe 19 inside gas-collection box 2, exhaust gas recovery hole 17, exhaust port of fan 8, pipe 6, gas-collection box 2 and high-temperature gas ejecting hole 16 altogether form a gas circulation loop. A clip electric heater 9 is installed in each gas-collection box 2. This clip electric heater 9 is located on the gas passage between high-temperature gas ejecting hole 16 and gas inlet of gas-collection box 2. Gas-collection box 2 in the upper furnace body 5 is in section view state. Each gas-collection box 2 in the upper furnace body 5 is hung on two screws 20 via nuts 22. Screw 20 that can rotate is fixed on the top wall of the upper furnace body. The top of screw 20 is connected with the control mechanism 21 composed of worm and gear. Under control of control mechanism 21, screw 20 rotates and makes gas-collection box 2 move up and down. Each gas-collection box 2 in lower furnace body 1 is supported on two or four screws 24 via nuts 23 respectively. The lower end of screw 24 can be installed rotately on the lower furnace body 1. The lower end of screw 24 is connected with control mechanism 25 composed of worm and gear. Under control of mechanism 25, each screw 24 rotates and makes gas-collection box 2 that is connected with it move up and down.

Figures 3, 4:
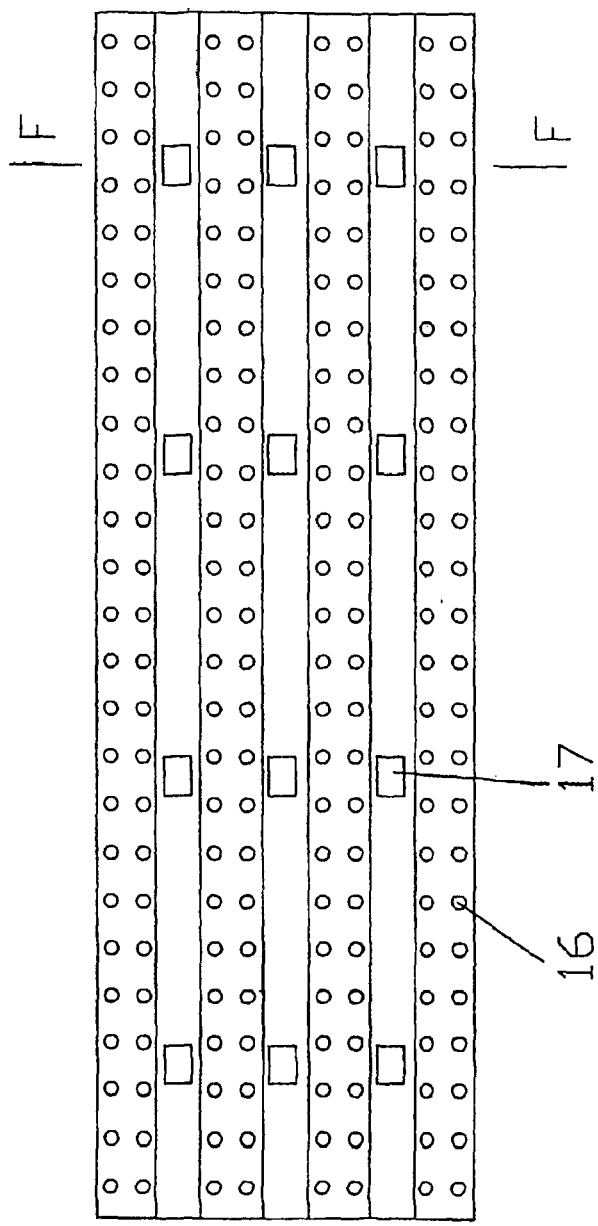
FIG. 3 is a schematic diagram of the structure of the jet-flow plate.
FIG. 4 is F-F view of FIG. 3.

Shown as in FIGS. 3 and 4, the cross section of jet-flow plate 18 at the gas outlet of gas-collection box 2 is in wave form. Each gas ejecting hole 16 is set at the wave trough. Each square exhaust gas-recovery hole 17 is set at the wave crest. In gas-collection box 2, said high-temperature gas ejecting hole 16 is close to glass transportation roller-table 12. Exhaust gas recovery hole 17 is far away from glass transportation roller-table 12. Pipe 19 connects exhaust gas recovery hole 17 with the inner cavity of the furnace body, but is isolated from the inner cavity of gas-collection box 2. The wave type of cross section of jet-flow plate 18 can be even wave shape or uneven wave shape in which the locations of each wave crest and wave trough are incongruous. Because jet-flow plate 18 of gas-collection box 2 in upper furnace body 5 directly faces the glass to be heated, while jet-flow plate 18 of gas-collection box 2 in lower furnace body 1 is separated from the lower surface of glass by the glass transportation roller-table, therefore, the form of the jet-flow plate of gas-collection box 2 in the upper and lower furnace bodies can be made in different shapes in order to make the upper and lower surfaces of the glass to be heated evenly. Each gas-collection box and jet-flow plate in upper furnace body 5 or lower furnace body 1 also can be made in different shapes in order to make glass to be heated evenly in each part of upper furnace body 5 and lower furnace body 1.

Figures 5, 6:
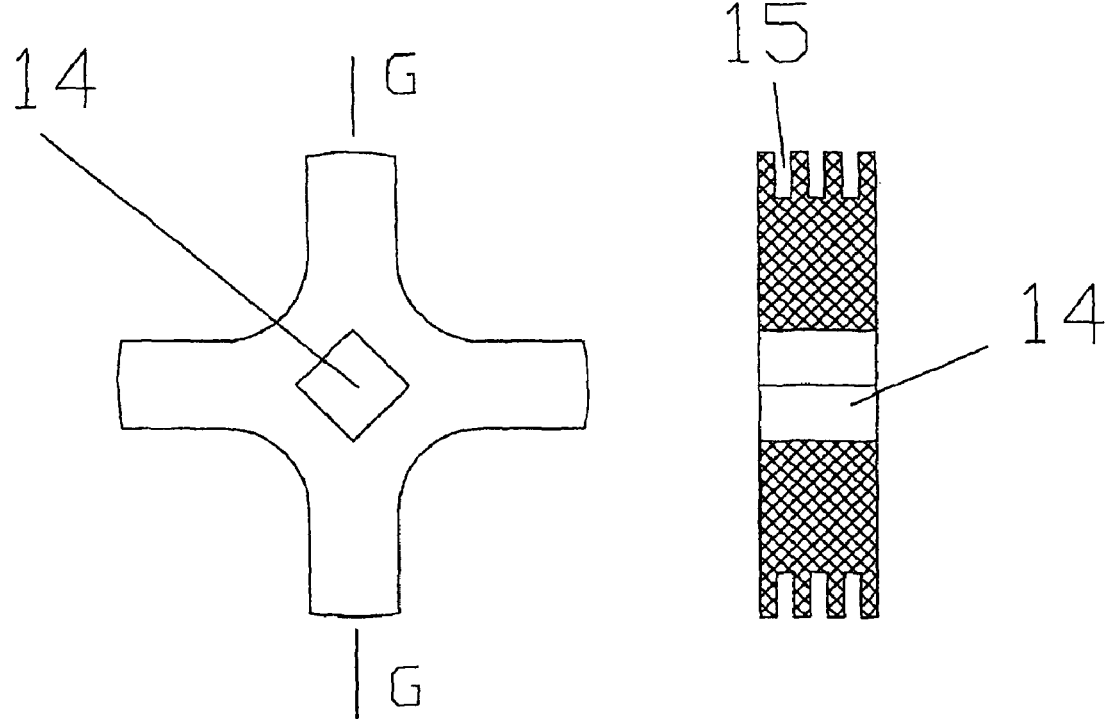
FIG. 5 is a schematic diagram of the structure of the insulation porcelain.
FIG. 6 is G-G view of FIG. 5.

What is shown in FIGS. 5 and 6 is a schematic diagram of the structure of insulated porcelain. Clip electric heater 9 is composed of several insulated porcelains and resistance-tapes, said insulated porcelains are overlaid into a column, and said resistance tapes wind around the column in spiral form via the opening trough 15 on the insulated porcelain. The insulated porcelain column is supported on the side wall of gas-collection box 2. Both ends of the resistance tape are lead out through the installation flange set at one end of the insulated porcelain, wherein one pole is connected with a metal connection rod that runs thought the hole 14 inside the insulated porcelain.

When the invented device is working, glass 11 to be heated enters the furnace body through glass inlet 3 from one side of the furnace body and is supported on glass transportation roller-table 12. Fan 8 send gas along arrow C in FIG. 1 into each gas-collection box 2. Gas that entered gas-collection box 2 turns into high temperature gas with the help of heater 9. The heated high-temperature gas is ejected onto the upper and lower surfaces of glass through high-temperature gas ejecting hole 16 on jet-flow plate 18. The exhaust gas after convection and heat exchanging with glass to be heated enters the inner furnace cavity that is far from the glass through exhaust gas recovery hole 17 and pipe 19. The exhaust gas is sucked in fan 8 through holes set in the furnace body, then, fan 8 send the sucked exhaust gas to gas-collection box 2 again to make another circulation; it circulates again and again like this.

After gas-collection box 2 that can move up and down is installed in the upper and lower furnace bodies, it is not only convenient for repair and maintenance of gas-collection box 2, but also convenient for change and maintenance of the heater inside gas-collection box 2.

Glass surfaces to be heated can be covered with numbers of gas-collection boxes 2 which are set inside the upper and lower furnace bodies respectively. In this way, it is not only convenient for process, installation and maintenance of gas-collection box 2, but also more convenient for distribution of heating power at each part of the furnace body, and favorable for control of glass-heating state. Because gas-collection box 2 is set in upper furnace body 5 and lower furnace body 1 respectively, and each gas-collection box 2 is correspondingly independent, so, quantity of gas-collection boxes and position of each gas-collection box can be set pertinently according to the actual situation of the upper and lower surfaces of heated glass. Gas-collection boxes in the upper and lower furnace bodies can be set symmetrically or not. The heating power of the heater in each gas-collection box can be the same, and can be different. The volume and structure of each gas-collection box can be completely the same, and also can has different structure and size.

What is claimed is:

1. A convection glass furnace comprising:
   a housing having a glass inlet receiving glass plates for treatment and a glass outlet outputting treated glass plates;
   a roller table transporting glass plates through said housing for treatment;
   a plurality of gas collection boxes disposed above and below said roller table, each gas collection box being a sealed enclosure having:
   a cold gas inlet;
   an exhaust outlet;

a heating device disposed in said sealed enclosure, said heating device receiving cold gases from said cold gas inlet and heating said cold gases to form hot gases;

a jet-flow plate formed on said sealed enclosure and disposed adjacent to said roller table and having a plurality of hot gas outlets arranged to blow said hot gases toward said glass plates to heat said gas plates, said jet-flow plate further having a plurality of exhaust gas inlets collecting exhaust gases from said glass plates; and a suspension mechanism and an upper and lower body with at least one gas collection box being disposed in each of said bodies and, wherein said gas-collection box in the upper furnace body can be moved up and down by said suspension mechanism relative to the glass plates;

wherein said exhaust gases are passed through said sealed enclosure to said cold gas inlet.

2. The convection glass heating furnace according to claim 1, wherein the heating device is an electric heating element.

3. The convection glass heating furnace according to claim 2, wherein the electric-heating element is a clip heater, said heater being composed of insulated porcelain, and resistance wires or resistance tapes, a number of grooves being made around the insulated porcelain, a column being formed with numbers of overlaid insulated porcelains, resistance wires or resistance tapes winding around the column in spiral form via the number of grooves on the insulated porcelain, two poles being lead out through a installation flange at one end of the column.

4. The convection glass heating furnace according to claim 1, wherein the suspension mechanism includes a mechanism composed of screws and nuts, the gas-collection box being hung on the screws via nuts, and the screws being fixed on the upper furnace body, the upper end of which protruding out of a top wall is connected with a control mechanism having at least one of a worm gear and chain wheels.

5. The furnace of claim 1 wherein each enclosure includes an exhaust outlet ejecting said exhaust gases from said exhaust gas inlet, further comprising external pipes conducting exhaust gases from said exhaust outlet to said cold gas inlet.

6. The furnace of claim 5 wherein each enclosure includes an exhaust pipe conducting said exhaust gases from said exhaust gas inlets to said exhaust outlet.

7. The furnace of claim 6 further comprising a fan pushing the exhaust gases through said external pipes.

8. The furnace of claim 1 wherein each said jet flow plate extends generally in parallel with said glass plates and is in the shape of a wave having peaks and valleys with the peaks being disposed closer to the glass plates then the valleys, wherein said hot gas outlets are disposed at said peaks and said exhaust gas inlets are disposed at said valleys.

9. The furnace of claim 1 further comprising, a set of external pipes, a furnace top and a furnace bottom, a top fan disposed at the top of said furnace, and a bottom fan disposed at the furnace bottom, said fans and external pipes cooperating to define independent gas collection loops for the collection boxes disposed above and below said glass plates, respectively to circulate exhaust gases from the said exhaust outlets to said cold gas inlets.

10. A convection glass furnace comprising:

a housing having a glass inlet receiving glass plates for treatment and a glass outlet outputting treated glass plates;

a roller table transporting glass plates through said housing for treatment;

a plurality of gas collection boxes disposed above and below said roller table, each gas collection box being a sealed enclosure having:

a cold gas inlet;

an exhaust outlet;

a heating device disposed in said sealed enclosure, said heating device receiving cold gases from said cold gas inlet and heating said cold gases to form hot gases;

a jet-flow plate formed on said sealed enclosure and disposed adjacent to said roller table and having a plurality of hot gas outlets arranged to blow said hot gases toward said glass plates to heat said gas plates, said jet-flow plate further having a plurality of exhaust gas inlets collecting exhaust gases from said glass plates; and an upper and a lower furnace body with at least one gas collection box disposed in said bodies, and a lifting and a lowering mechanism for supporting and selectively lifting and lowering the gas-collection box in the lower furnace body;

wherein said exhaust gases are passed through said sealed enclosure to said cold gas inlet.

11. The convection glass heating furnace according to claim 10, further comprising a control mechanism, wherein the lifting and lowing mechanism is a screw-and-nut lifting and lowering mechanism, said gas-collection box being fixed with nuts and connected with the screws by the nuts each screw being rotatably installed in the lower furnace body, and being able to rotate under control of the control mechanism.

* * * * *

UNITED STATES PATENT AND TRADEMARK OFFICE
CERTIFICATE OF CORRECTION

PATENT NO. : 7,748,237 B2  
APPLICATION NO. : 11/569541  
DATED : July 6, 2010  
INVENTOR(S) : Yan Zhao Page 1 of 1

It is certified that error appears in the above-identified patent and that said Letters Patent is hereby corrected as shown below:

Title Page,

Item (75) Inventor:

Change "Yan Zhao, Luovang Henan (CN)" to -- Yan Zhao, Luoyang Henan (CN) --

Item (73) Assignee:

Change "Landglass Technology Co. Ltd, Luonyang (CN)" to -- Landglass Technology Co., Ltd.

Luoyang (CN) --

Signed and Sealed this

Twenty-sixth Day of October, 2010

David J. Kappos
*Director of the United States Patent and Trademark Office*